United States Patent [19]

Rothenberg et al.

[11] 4,422,303
[45] Dec. 27, 1983

[54] PROCESS FOR COOLING A CONTINUOUSLY MOVING MATERIAL TO A PREDETERMINED TEMPERATURE

[75] Inventors: Douglas H. Rothenberg, Shaker Heights; Ronald L. Nicholson, Brunswick, both of Ohio

[73] Assignee: The Standard Oil Company, Cleveland, Ohio

[21] Appl. No.: 392,406

[22] Filed: Jun. 25, 1982

[51] Int. Cl.³ ............................................. F25D 13/06
[52] U.S. Cl. .......................................... 62/63; 62/216; 164/455
[58] Field of Search ..................... 62/63, 64, 374, 380, 62/201, 216; 236/15 BC; 164/455

[56] References Cited

U.S. PATENT DOCUMENTS 3,915,216 10/1975 Fekete et al. ..................... 164/455
4,024,764 5/1977 Shipman et al. .................. 164/455
4,354,357 10/1982 Hofstetter ........................... 62/216

FOREIGN PATENT DOCUMENTS 56-33157 3/1981 Japan .

*Primary Examiner*—Ronald C. Capossela
*Attorney, Agent, or Firm*—William A. Heidrich; Herbert D. Knudsen; Larry W. Evans

[57] ABSTRACT

A continuously controlled process for cooling a material to within a desired temperature range as the material moves along a path, especially suitable for situations in which the amount of material being cooled is unknown. The material is first contacted with a known amount of cooling liquid, e.g., water. The temperature of the water (or steam) is measured after contact with the material, and this information is then used to determine the amount of additional cooling required. An embodiment utilizing the process to cool calcined coke in a rotary cooler is described.

9 Claims, 1 Drawing Figure

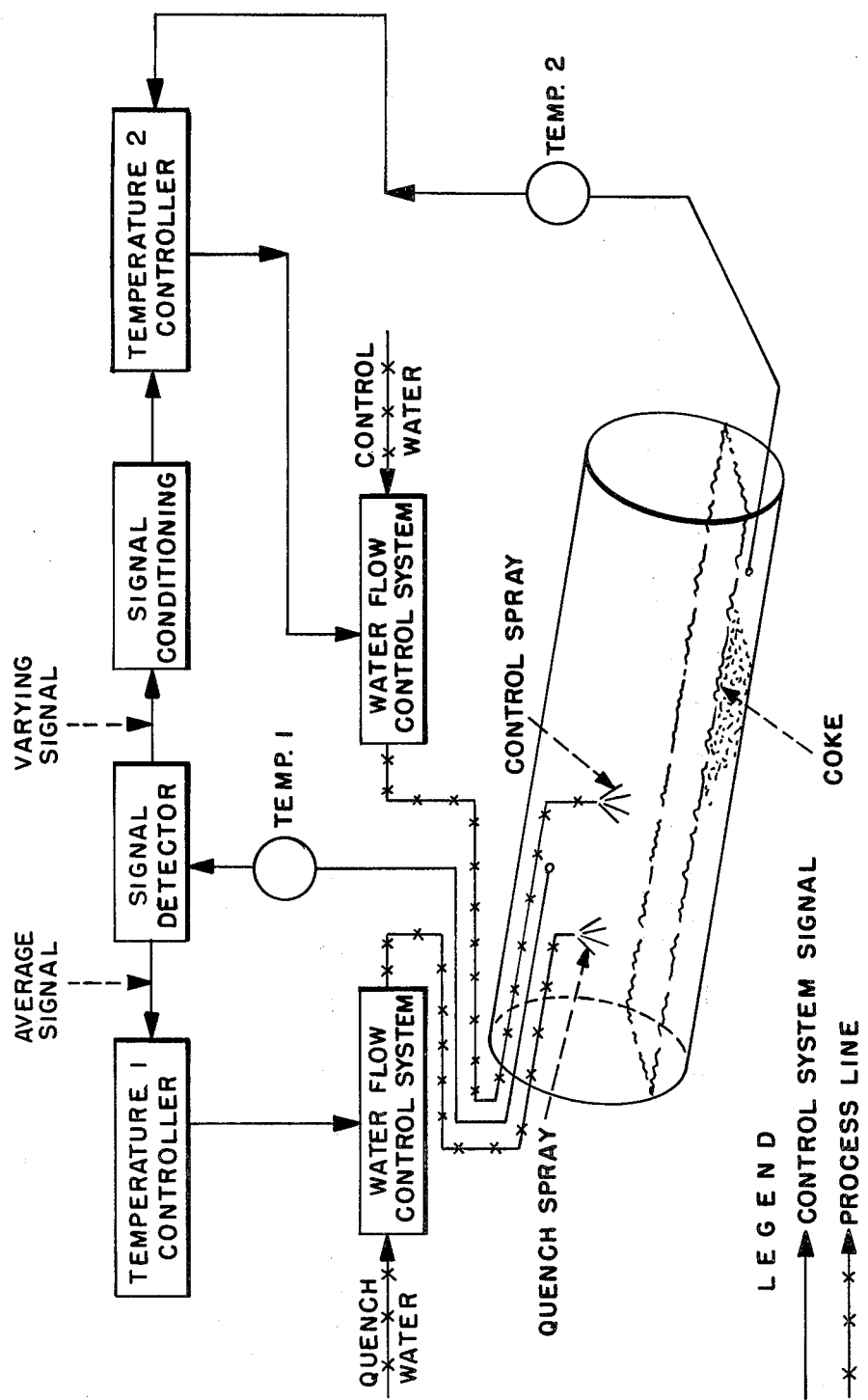

PROCESS FOR COOLING A CONTINUOUSLY MOVING MATERIAL TO A PREDETERMINED TEMPERATURE

BACKGROUND OF THE INVENTION

1. Field of the Invention

This invention relates to a process for cooling a hot material to a predetermined temperature as the material is conveyed along a path. In one embodiment, the invention relates to a process for cooling calcined cake.

2. Discussion of the Art

Engineers face a difficult task in designing systems to alter the temperature of materials where the temperature of the material itself cannot be directly measured. Further problems are presented when the amount of material to be cooled cannot be kept constant. Existing systems often result in imprecise control of the material temperature.

Such problems are encountered in, among other places, systems used for cooling calcined coke. Coke is typically formed by the severe heating of a carbonaceous material such as coal or petroleum in an inert atmosphere. After formation, coke which is of sufficient quality can be calcined and further processed to be used in the manufacture of graphite electrodes for the aluminum and steel industries.

Green (uncalcined) petroleum coke is processed by heating it to remove the volatile materials which remain after the coking operation and to change the carbon to hydrogen ratio from about 20:1 to about 1000:1. This calcination typically occurs at temperatures from about 1500° to 3000° F. (815° C. to 1630° C.), preferably from about 2200° to 2600° F. (1200° C. to 1425° C.). Coke exiting the kiln is usually cooled before additional handling or subsequent steps of crushing, mixing with fillers, adding binding agents, and forming.

A conventional means for cooling the coke is a rotary cooler. This is a large cylinder which is slightly inclined from horizontal and slowly rotates such that coke deposited in the upper end will eventually be conveyed by gravity to the opposite end. One or more water quench systems are provided to cool the coke to the desired temperature range and to prevent heat damage to the rotary cooler and related equipment.

Existing process controls have measured the coke temperature at the discharge end of the cooler and have adjusted the rate of a quench spray near the entrance end to keep the discharge coke temperature at the desired value. Changes in the quench spray flowrate can be made to follow significant fluctuations in the coke mass flowrate.

Several problems are found in existing means for cooling coke to a predetermined temperature. One is that the temperature of the coke leaving the kiln and entering the cooler cannot be directly measured because of the physical disturbances during the transfer and the extreme temperatures encountered. Another is that intentional load changes caused by changed output from the kiln require adjustments in the rate of quench water delivered to the cooler. Yet another is that even a constant feed of uncalcined coke to the kiln can produce uneven amounts of coke flow through the kiln and cooler. Still another is that conventional attempts to measure the coke temperature as it exits the cooler and thereby adjust the rate of cooling at the opposite end results in a delayed feedback of the effects of those adjustments, which can produce wide fluctuations in temperature.

If insufficient quench water is used and the coke remains too hot, serious damage to the equipment may result. If too much water is used to cool the coke, it will not meet product specifications. Consequently, it is desirable to conduct the cooling so that coke exiting the cooler is within a specific temperature range.

SUMMARY OF THE INVENTION

This invention concerns a continuous process for cooling a material to a predetermined temperature in which the material is continuously conveyed along a travel path having an upstream portion and a downstream portion. The process comprises contacting the material in the upstream portion of the travel path with a first amount of a cooling fluid at a predetermined flowrate to at least partially cool the material, continuously measuring the temperature of the cooling fluid after it contacts the material, contacting the material in the downstream portion of the path with an additional amount of a cooling fluid to further cool the material, and adjusting the flowrate of the additional cooling fluid in response to the measured temperature so that the material is cooled approximately to the predetermined temperature.

BRIEF DESCRIPTION OF THE DRAWING

The sole FIGURE is a schematic drawing of an apparatus and control system for carrying out a preferred embodiment of the invention.

DETAILED DESCRIPTION OF THE INVENTION

The inventive process is useful for any situation in which it is desirable to indirectly measure and control the temperature of a material as it travels along a given path. Any conveying means such as pipes, conveyor belts, rotating wheels, inclined surfaces, and the like which can cause the transfer of material along the travel path can be used.

Although this specification specifically refers to a cooling process, those skilled in the art will recognize from this description that a material can be heated or otherwise treated and that the effects of such treatment can then be determined by measuring the condition of the treating fluid after it contacts the material. The rate of treatment can then be adjusted in response to this measured condition. To further illustrate the invention, an embodiment for cooling calcined coke will be described in greater detail.

Hot calcined coke spills from the kiln into a rotary cooler which has a length of approximately ten times its diameter. The inlet end of the cooler, or upstream end, has one or more water spray devices such as nozzles referred to as the quench spray. This spray directs water to pre-cool the coke and to prevent equipment damage from overheating. The flowrate for the quench spray, determined by routine experimentation, should provide adequate initial cooling for the coke at a certain rate of throughput. If throughput increases due to increased coke output from the kiln, the quench spray flowrate can be increased to provide relatively larger amounts of water. In the absence of fluctuations in throughput, the quench spray is kept at a constant predetermined flowrate.

As water from the quench spray contacts the hot coke, significant amounts of steam are produced. Because the coke is substantially hotter than the water, the resulting steam is superheated, that is, heated to a temperature significantly above the boiling point of water.

A temperature probe is placed inside the cooler near the inlet and quench spray. This probe is positioned downstream from the quench spray nozzles to measure the temperature of steam produced by water contacting the hot coke. Because the steam is superheated, its temperature is measured as a means for determining the temperature of the cooling fluid in this embodiment.

The steam temperature is a function of several variables including principally the amount of coke and its temperature, the amount of quench water, and the rotation speed of the cooler. When these variables are constant, the steam temperature should be constant. Changes in temperature would thus provide an indicator of changes in the amount of coke passing through the cooler.

One or more additional spray devices, called the control spray, are provided at a point downstream from both the quench spray and the temperature probe. The control spray further cools the coke by applying water at a flowrate such that the coke exiting the cooler will be at the desired temperature. A baseline flowrate can be set by routine experimentation, including measuring the coke temperature at the discharge end and correspondingly adjusting the water flowrate to provide more or less cooling. If the temperature probe detects a significant fluctuation in temperature, the control spray is further adjusted from that baseline flowrate to provide more or less water to adequately cool the coke as it passes.

It is important that the placement of the temperature probe relative to the control spray and quench spray be such that the temperature probe principally measures the steam from the quench spray, not the control spray. This can be accomplished by extending the control spray sufficiently downstream so that its effects on the temperature being measured are minimized.

It should be understood that the flowrate to the quench and control sprays would not change under ideal operating conditions because coke leaves the kiln at a fairly uniform temperature. A baseload flowrate of water can therefore be provided to each spray nozzle which is adequate to properly cool the average amount of coke travelling through the cooler.

Under actual operations, however, uneven amounts of coke leaving the kiln cause significant coke flow fluctuations. These disturbances in coke mass flowrate will be reflected in variations of the temperature of the steam caused by the quench spray. The flowrate of the control spray is then increased or decreased as needed from the baseload value in response to the signal from the temperature probe.

SPECIFIC EMBODIMENT

The description of the preferred embodiment will refer to the sole FIGURE which is a schematic drawing of a coke cooler and control system capable of carrying out the inventive process. The water sprays and temperature probes are drawn to show their position relative to the coke cooler, although in actual operation these items must be supported by cantilevers into the aperture of the rotating cylinder.

Water to the Quench Spray passes through a Water Flow Control System which keeps the flowrate constant at a predetermined level. Downstream from the Quench Spray, a probe (Temp. 1) measures the steam temperature. A Signal Detector of conventional design is used to decompose the measured temperature signal into two components: an Average Signal and a Varying Signal. The Varying Signal, directly related to the amount of coke which is passing the Quench Spray and temperature probe, is the algebraic subtraction of the averaged signal from the original signal which is further filtered by Signal Conditioning to remove any spurious noise. This signal determines, at least in part, the level of the Control Spray after passing through the Temperature 2 Controller and an additional Water Flow Control System.

The Average Signal from the Signal Detector is the steam temperature averaged over a period of time and is used to gradually control changes in the baseload flowrate of the Quench Spray. Adjustments to the baseload flowrate are made by the Temperature 1 Controller only gradually, if at all, because a changed quench spray flowrate would affect the temperature to be measured by the probe. However, if the Average Temperature indicates that the quench spray flowrate remains consistently different than that which is needed to adequately cool the coke, the Average Signal will be used to slowly adjust the flow set point of the quench spray. In this way, the predetermined quench flowrate can be adjusted with a minimal effect on the operation of the overall process.

Under normal operations in this embodiment, more than half of all of the cooling water would be provided by the Quench Spray. Under ideal conditions, substantially all of the cooling water would be provided by the quench spray, with the baseload rate for the control spray set at a minimal level sufficient to prevent clogging of the nozzle.

In a more preferred embodiment, the above-described process is supplemented by a second probe (Temp. 2) positioned at the discharge end of the cooler to measure the temperature of the coke as it leaves the cooler. This is a drag probe which measures coke temperature, not steam temperature. The desired temperature range for coke exiting the cooler is between about 200° to 400° F. (95° to 190° C.). If the coke shows consistent deviation from the average desired temperature for the product, the signal is fed to the Temperature 2 Controller where it is algebraically summed with the Varying Signal from the Signal Detector of Temp. 1. Thus, in this embodiment, the signal from the probe at the discharge end is summed with the Varying Signal from the first probe (near the inlet end) and the resulting signal provides overall operation of the control spray.

We claim:

1. A continuous process for cooling a material to a predetermined temperature comprising continuously conveying said material along a travel path having an upstream portion and a downstream portion, the process comprising
   (a) contacting the material in the upstream portion of said travel path with a first amount of a cooling fluid at a predetermined flowrate to at least partially cool said material,
   (b) continuously measuring the temperature of the cooling fluid after it contacts said material,
   (c) contacting the material in the downstream portion of said travel path with an additional amount of a cooling fluid to further cool said material, and
   (d) adjusting the flowrate of said additional cooling fluid in response to said measured temperature so that said material is cooled approximately to said predetermined temperature.

2. The process of claim 1 in which the material is contacted with a cooling fluid comprising water and the fluid is superheated after it contacts the material.

3. The process of claim 2 in which the first amount of the cooling fluid is at least half of the total amount of fluid required to cool said material to the predetermined temperature.

4. The process of claim 2 in which the additional amount of cooling fluid is applied at a point sufficiently downstream such that the effects of said additional amount of cooling fluid on the temperature being measured are minimized.

5. The process of claim 2 in which the measured temperature used to adjust the flowrate of the additional cooling fluid is decoded into a varying signal and an average signal, which varying signal is the algebraic substraction of the average signal from the original measured signal.

6. The process of claim 5 in which the flowrate of the additional cooling fluid is adjusted in response to the varying signal.

7. The process of claim 6 in which said predetermined flowrate of the first amount of cooling fluid is adjusted in response to the average signal from the measurement of the cooling fluid.

8. The process of claim 6 in which the flowrate is further adjusted in response to a temperature measured at a point downstream from the application of additional cooling fluid.

9. The process of claims 1 or 5 in which the material is coke, the cooling fluid is water, the temperature of the cooling fluid being measured is above 100° C., and the predetermined temperature is between about 95° to 190° C.

* * * * *